(12) United States Patent
Kagawa

(10) Patent No.: US 6,569,259 B1
(45) Date of Patent: May 27, 2003

(54) METHOD OF DISPOSING OF A WASTE OPTICAL DISC

(75) Inventor: Keiichi Kagawa, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/701,483

(22) PCT Filed: Mar. 29, 2000

(86) PCT No.: PCT/JP00/01974

§ 371 (c)(1),
(2), (4) Date: Nov. 29, 2000

(87) PCT Pub. No.: WO00/58957

PCT Pub. Date: Oct. 5, 2000

(30) Foreign Application Priority Data

Mar. 30, 1999 (JP) ............................................. 11-088055

(51) Int. Cl.⁷ ................................................. B08B 7/04
(52) U.S. Cl. ...................... 134/37; 134/42; 264/36.13; 156/344
(58) Field of Search ................................ 156/344, 584; 29/239, 426.5; 264/36.1, 36.13, 36.18; 134/2, 34, 37, 42

(56) References Cited

U.S. PATENT DOCUMENTS

| | | | | |
|---|---|---|---|---|
| 5,879,504 A | * | 3/1999 | Winter | 15/3.53 |
| 5,972,159 A | * | 10/1999 | Uryu et al. | 156/344 |
| 5,994,207 A | * | 11/1999 | Henley et al. | 438/455 |
| 6,066,229 A | * | 5/2000 | Komine et al. | 134/1 |
| 6,221,740 B1 | * | 4/2001 | Bryan et al. | 125/23.01 |
| 6,263,941 B1 | * | 7/2001 | Bryan et al. | 156/239 |

FOREIGN PATENT DOCUMENTS

| | | |
|---|---|---|
| JP | 11-35733 | 9/1999 |
| JP | 2000-94448 | 4/2000 |

* cited by examiner

*Primary Examiner*—Randy Gulakowski
*Assistant Examiner*—Joseph Perrin
(74) *Attorney, Agent, or Firm*—Lowe Hauptman Gilman & Berner, LLP (57) ABSTRACT

A disposal method of a waste optical disc is useful when a substrate material is collected from the disc. A space is created between a recording layer and a reflective layer between both of which there exists the smallest mutual adhesion by cutting a surface of a protective layer side of an optical disc. Then, the reflective layer and the protective layer are peeled off and removed from the optical disc by introducing air into the space therebetween. Then, the recorded layer remaining on a substrate layer can be removed by cutting.

20 Claims, 8 Drawing Sheets

METHOD OF DISPOSING OF A WASTE OPTICAL DISC

TECHNICAL FIELD

The present invention relates to a method of disposing of a waste optical disc for collecting a substrate material from an optical disc treated as waste.

BACKGROUND ART

Optical discs, if physically classified, are roughly divided into read-only discs, write-once discs and rewritable discs. A CD known as one of the read-only discs is configured in such a manner that a reflective layer and a protective layer are laminated in order on a substrate layer. Also, a CD-R known as one of the write-once discs is configured in such a manner that a recording layer, a reflective layer and a protective layer are laminated in order on a substrate layer. Further, a CD-RW known as one of the rewritable discs is configured in such a manner that a dielectric layer, a recording layer, a dielectric layer, a reflective layer and a protective layer are laminated in order on a substrate layer.

Every existent optical disc is provided with a substrate layer mainly composed of the optical disc. The substrate layer is formed of a material pervious to a laser beam for data reproducing or date recording, for example, such as polycarbonate resin, acryl resin, polyolefin system resin, epoxy resin, glass or the like.

Now, concerning the aforesaid optical discs, as their demand increases, a waste disposal thereof becomes a problem. By the way, the optical discs treated as waste include discs damaged in the middle of a production, discs treated as defective at a final inspection process after the production, discs treated as surplus stock or the like.

Up until now, a method for burying trituration of the waste optical disc or a method for incinerating the waste optical disc has been adapted as a disposal method for the waste optical disc. However, in case of the former disposal method, it is difficult to select a burying ground and in case of the latter disposal method, there is a problem that a special incinerator is required. There is no saying that any of these disposal methods is undesirable in view of environmental conservation.

In view of the aforesaid situation, recently a method for collecting a substrate material by chemically removing a layer portion other than a substrate layer from a waste optical disc has been proposed. (For example, Japanese Patent No. 2615277 or Japanese Patent Laid-Open No. 8-164524.) However, the disposal methods as described in these official gazettes have a problem in that a range of applications is reduced at the time of recycling the substrate material, because a chemical material change to the substrate material comprising polycarbonate resin or the like in a disposal process and it is difficult to secure an expected quality of the collected substrate material.

An object of the present invention is to provide a disposal method of the waste disc collectable from the optical disc treated as waste without causing any material change to the substrate material.

SUMMARY OF THE INVENTION

A disposal method of a waste optical disc having at least one other layer on a substrate layer, comprises the steps of creating a space between layers by giving an external force to the disc, and peeling off at least one of the other layers from the disc by making gas invade into a space. According to this disposal method, by giving the external force to the disc so as to create the space between the layers, and by making a gas such as air or the like invade into this space, at least one of other layers can be peeled off and easily removed.

The above and other objects, features, and advantages of the present invention will become more apparent from the following description and the accompanying drawings.

PREFERRED EMBODIMENTS FOR CARRYING OUT THE INVENTION

Figure 1:
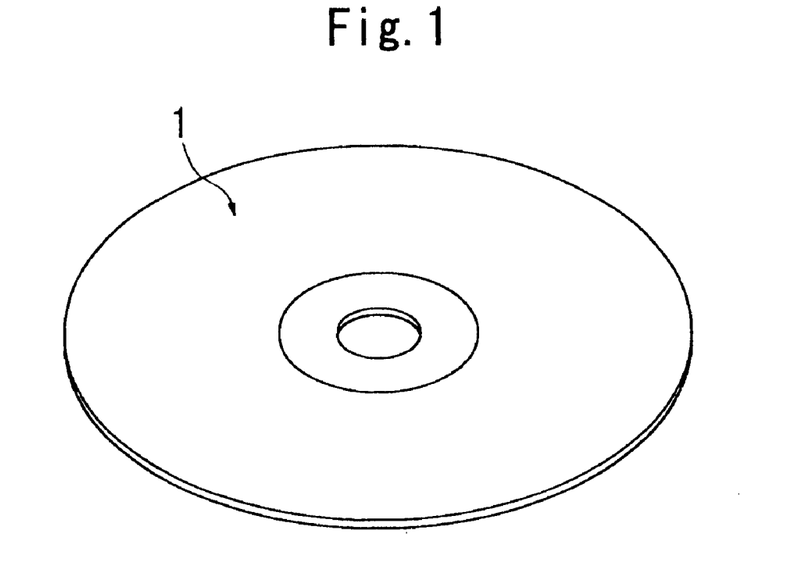
FIG. 1 is a perspective view of an optical disc according to one embodiment of the present invention.
Figure 2:
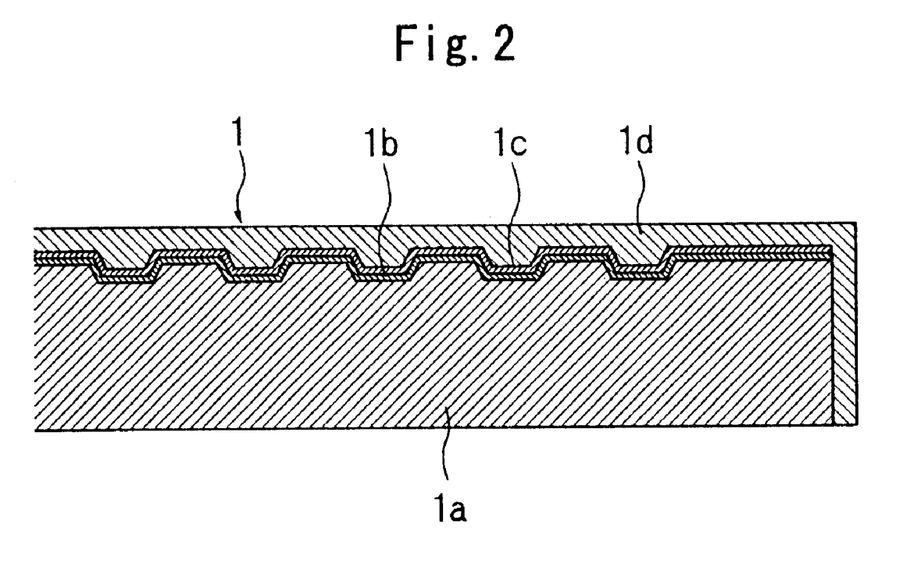
FIG. 2 is a partial longitudinal section of the optical disc as shown in FIG. 1.
Figure 3:
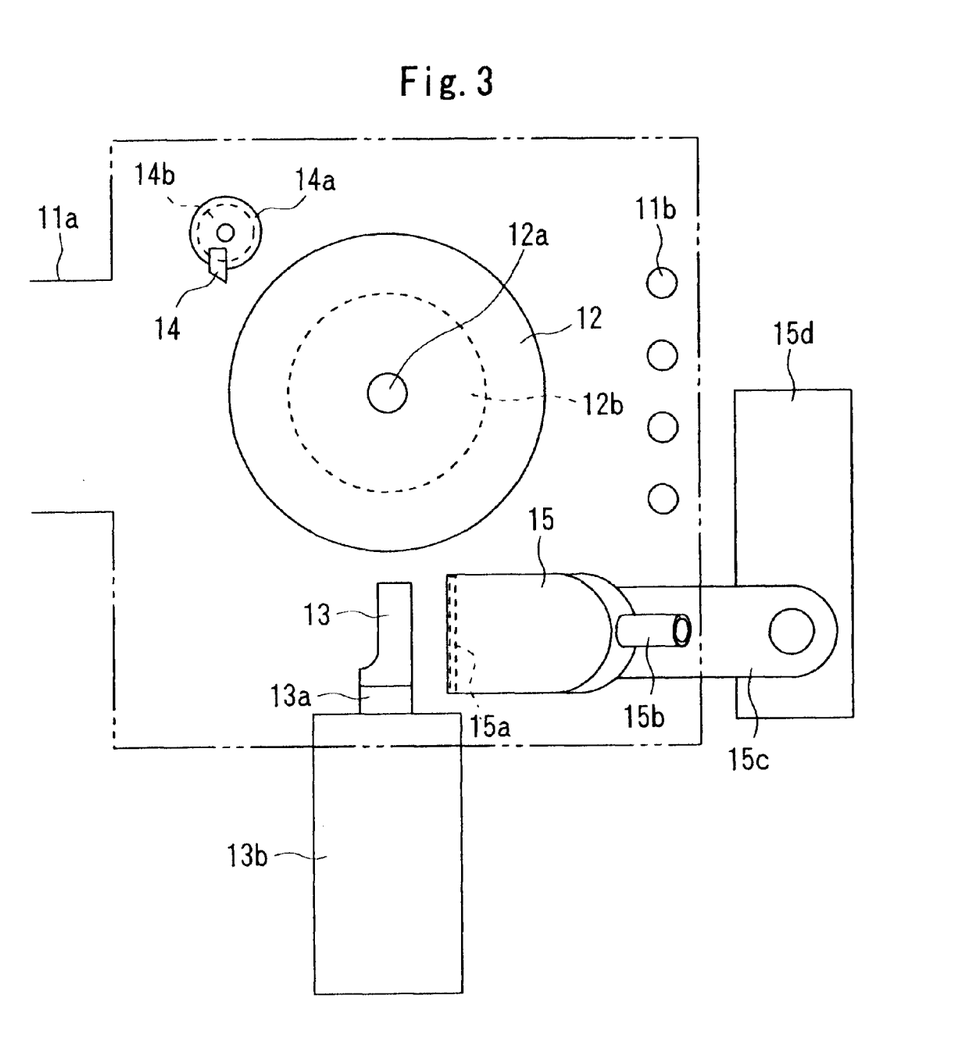
FIG. 3 is a top schematic of a disposal apparatus of a waste optical disc.

FIG. 1 to FIG. 9 show one embodiment of the present invention. FIG. 1 is a perspective view of an optical disc serving as a disposal object. FIG. 2 is a partial longitudinal section of the optical disc as shown in FIG. 1. FIG. 3 is a top schematic of a disposal apparatus of a waste optical disc. FIG. 4 to FIG. 9 are diagrams of a disposal method of the waste optical disc.

First, referring to FIG. 1 and FIG. 2, a description will be made on the optical disc serving as the disposal object. The optical disc 1 as shown in FIG. 1 and FIG. 2 is a CD-R known as one of write-once discs. This optical disc 1 is configured by laminating in order a recording layer 1b, a reflective layer 1c and a protective layer 1d on a substrate layer 1a. The protective layer 1d reaches an outer peripheral surface of the substrate layer 1a.

The substrate layer 1a comprises thermoplastic resin such as polycarbonate, acryl or the like. The recording layer 1b comprises organic coloring material system thin film such as cyanine, phthalocyanine, azo complex or the like. The reflective layer 1c comprises lustrous metal thin film such as aluminum or the like. The protective layer comprises resin film such as UV curing acryl or the like.

The recording layer 1b adheres to one side of the substrate layer 1a. The reflective layer 1c adheres to one side of the recording layer 1b. The protective layer 1d adheres to one side of the reflective layer 1c. owing to a material of the substrate layer 1a and the respective layer 1b to 1c, a mutual adhesion between the recording layer 1b and the reflective layer 1c is smaller than a mutual adhesion between the substrate layer 1a and the recording layer 1b and smaller than a mutual adhesion between the reflective layer 1c and the protective layer 1d.

Next, referring to FIG. 3, a description will be made on the disposal apparatus of the waste optical disc. In the drawing, reference numerical 11 denotes a disposal chamber, reference numerical 12 a turn-table, 13 a first bite, 14 a second bite and 15 a blow-out nozzle. The disposal chamber 11 is for covering the turn-table 12, the first bite 13, the second bite 14 and the blow-out nozzle 15 at disposal time in sealing or semi-sealing conditions. On the top of the disposal chamber 11, there is provided a shutter (not shown) capable of opening and closing when the optical disc is placed on the top of the turn-table 12 before disposal or when the optical disc (the substrate layer) is removed from the turn-table 12 after disposal. Also, at the left side in the drawing of the disposal chamber 11, there is disposed an absorbing opening 11a, and connected to this absorbing opening 11a is a piping (not shown) from an air circuit (not shown) provided with a vacuum pump or the like. Further, at the right side bottom face in the drawing of the disposal chamber 11, there is provided an intake vent 11b.

The turn-table 12 is for supporting the optical disc serving as the disposal object. On the top center thereof, a locating jut 12a capable of engaging with the center hole of the optical disc is formed. The outside diameter of the turn-table 12 is slightly smaller than the outside diameter of the optical disc serving as the disposal object. Further, on the top of the turn-table 12, there is formed a plurality of absorbing holes (not shown) for absorbingly holding the optical disc. Although omitted from the drawing, the absorbing hole is connected to the piping from the air circuit provided with the vacuum pump or the like. Furthermore, to the bottom face center of the turn-table 12, a shaft of a motor 12b is connected so as to rotate the turn-table 12 counterclockwise in the drawing.

The first bite 13 is for cutting the top face of the optical disc serving as the disposal disc at a predetermined cutting depth. This first bite 13 is fixed at an arm 13a, and this arm 13a can make linear displacement by a linear drive mechanism 13b. That is, the first bite 13 can make reciprocating movements along a radial direction of the turn-table 12 by the operation of the linear drive mechanism 13b. By the way, for the linear drive mechanism 13b, a mechanism furnished with motor-driven ball screw and nut screwed therewith, a cylinder driven by air pressure and oil pressure or the like are used. Although omitted in the drawing, for a fixed portion of the first bite 13 and the movable arm 13a or the linear drive mechanism 13b, a mechanism for controlling a cutting depth for the optical disc is disposed.

The second bite 14 is for cutting the outer peripheral surface of the optical disc serving as the disposal object at a predetermined cutting depth. This second bite 14 is fixed at a rotating disk 14a, and this rotating disk 14a can make rotating displacement by a rotating drive mechanism 14b. That is, the rotating disk 14a can displace to a location withdrawn from the outer peripheral surface of the optical disc placed on the top of the turn-table 12 by the operation of the rotating drive mechanism 14b and to a location adjacent to the outer peripheral surface of the optical disc. By the way, for the rotating drive mechanism 14b, a motor, a movement conversion mechanism combined with a solenoid or the like are used.

The blow-out nozzle 15 is for blowing air to a disc cut off portion by the first bite 13. This blow-out nozzle 15 is provided with a flat blow-out orifice 15a and a piping connection orifice 15b. The blow-out nozzle 15 is fixed to an arm 15c in such a manner that the blow-out orifice 15a looks down obliquely toward the disc cut off portion by the first bite 13. The arm 15c can make linear displacement by the operation of the linear drive mechanism 15d. That is, the blow-out nozzle 15 can make reciprocating movements in a parallel direction with the first bite 13 by the operation of the linear drive mechanism 15d. By the way, for the linear drive mechanism 15d, a mechanism furnished with motor-driven ball screw and nut screwed therewith, a cylinder driven by air pressure and oil pressure or the like are used. Although omitted in the drawing, to the piping connection orifice 15b, a piping from an air circuit provided with a vacuum pomp or the like is connected.

Next, referring to FIG. 4 to FIG. 9, a description will be made on a procedure for executing the waste disposal of the optical disc 1 as shown in FIG. 1 and FIG. 2 by using a disposal apparatus as shown in FIG. 3.

Figure 4:
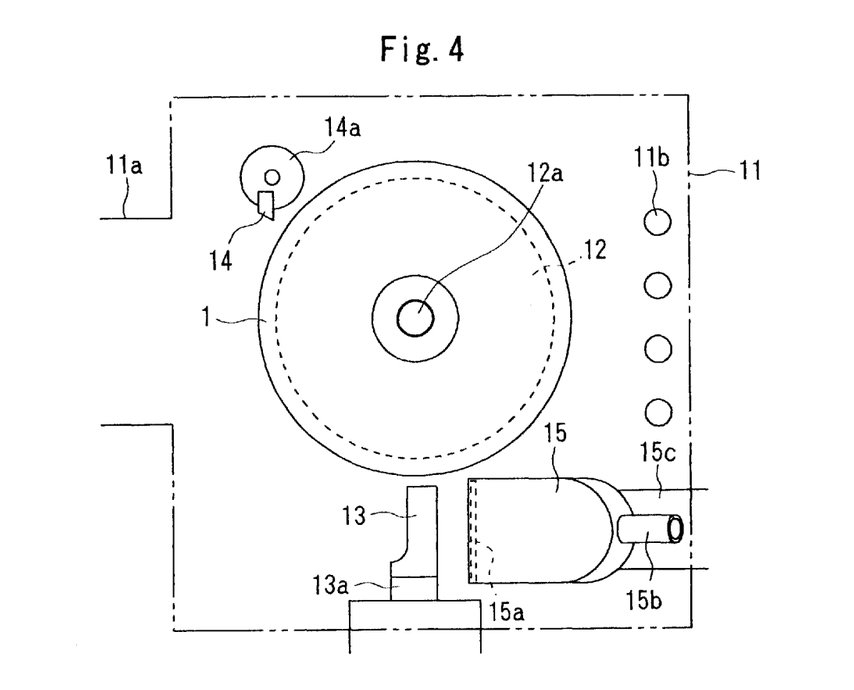
FIG. 4 is a diagram showing a procedure for executing waste disposal of the optical disc as shown in FIG. 1 and FIG. 2 by using the disposal apparatus as shown in FIG. 3.

At the time of the disposal, as shown in FIG. 4, the center hole of the optical disc 1 is engaged with the locating jut 12a and the optical disc 1 is placed on the top of the turn-table 12 in such a manner that the protective layer 1d looks upward. At this time, a negative pressure is acted upon a plurality of absorbing holes of the turn-table 12, thereby absorbingly holding the optical disc 1 placed on the top of the turn-table 12.

Figure 5:
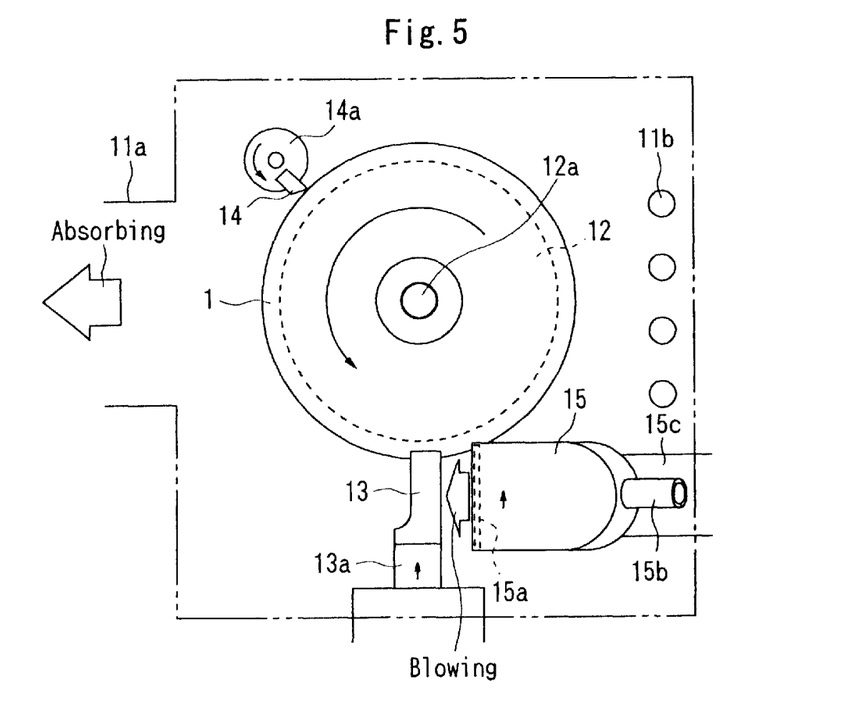
FIG. 5 is a diagram showing a procedure for executing waste disposal of the optical disc as shown in FIG. 1 and FIG. 2 by using the disposal apparatus as shown in FIG. 3.

Then, as shown in FIG. 5, the turn-table 12 is rotated counterclockwise, the first bite 13 is moved from a waiting position toward the center of the optical disc 1 at a certain speed, and the cutting of the surface of the protective layer side of the optical disc 1 by the first bite 13 is commenced. Also, the second bite 14 is moved from a waiting position to a position adjacent to the outer peripheral surface of the optical disc 1, and the cutting of the outer peripheral surface of the optical disc 1 by the second bite 14 is commenced. Further, by moving the blow-out nozzle 15 in parallel with the first bite 13 at a certain speed, air is blown to the disc cut off portion by the first bite 13 from the blow-out orifice 15a (refer to an arrow of blowing in the drawing) and air inside the disposal chamber 11 is absorbed outside through the absorbing opening 11a of the disposal chamber 11 (refer to an arrow of absorbing in the drawing).

Figure 6:
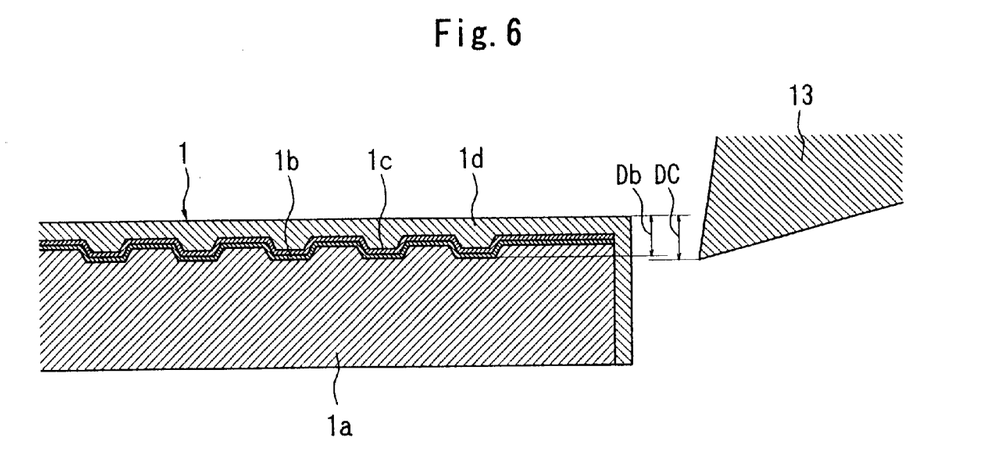
FIG. 6 is a diagram showing a procedure for executing waste disposal of the optical disc as shown in FIG. 1 and FIG. 2 by using the disposal apparatus as shown in FIG. 3.

As shown in FIG. 6, the cutting depth DC of the first bite 13 at this time is set slightly larger than the sum Db of thickness measurements of the protective layer 1d, the reflective layer 1c and the recording layer 1b. The cutting depth of the second bite 14 at this time is set slightly larger than the thickness of the protective layer 1d located at the outer peripheral surface of the optical disc 1.

Concerning the number of rotations of the turn-table 12 at the time when the surface of the protective layer side of the optical disc 1 is cut as well as feeding speeds of the first bite 13, in case of using a cemented carbide tip as the first bite 13, the number of rotations is preferably 2000 rpm to 6000 rpm and the feeding speed is preferably 10 mm/sec to 30 mm/sec. Also, in case of using a diamond tip as first bite 13, the number of rotations is preferably 2000 rpm to 5000 rpm and the feeding speed is preferably 20 mm/sec to 30 mm/sec. Although it is possible to adequately achieve an expected cutting by the number of rotations and the feeding speed other than the aforesaid, needless to mention, a good cutting is not executed unless a proper value is set for both of them.

Figure 7:
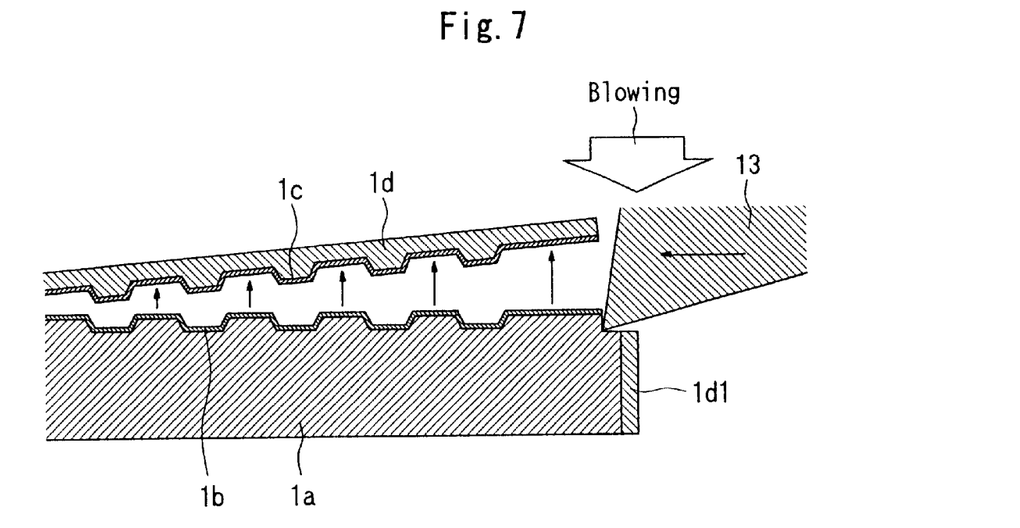
FIG. 7 is a diagram showing a procedure for executing waste disposal of the optical disc as shown in FIG. 1 and FIG. 2 by using the disposal apparatus as shown in FIG. 3.

As shown in FIG. 7, when the surface of the protective layer side of the optical disc 1 is cut at the aforesaid depth by the moving first bite 13 and the first bite 13 reaches the recording layer 1b and the reflective layer 1c, the space is partially created by the external force given by the cutting at a location adjacent to the bite in the boundary face of the recording layer 1b and the reflective layer 1c between both of which there exists the smallest mutual adhesion. Then, air blown at the disc cut off portion from the blow-out orifice 15a of the blow-out nozzle 15 invades from the space into the boundary face of the recording layer 1b and reflective layer 1c, and the reflective layer 1c and the protective layer 1d commence to peel off.

By absorbing air outside from the inside of the disposal chamber 11 through the absorbing opening 11a, in the inside of the disposal chamber 11 there is formed a flow of air toward the absorbing opening 11a from an intake vent 11b. For this reason, the reflective layer 1c and the protective layer 1d commencing to peel off are instantaneously peeled off from the optical disc 1 as if drawn into this flow of air and discharged outside the disposal chamber 11 from the absorbing opening 11a and collected inside a predetermined container.

Figure 8:
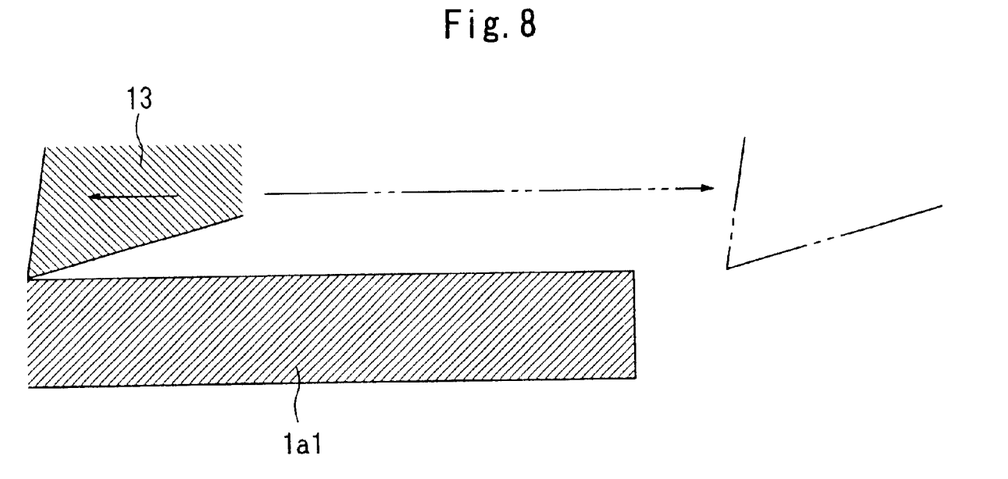
FIG. 8 is a diagram showing a procedure for executing waste disposal of the optical disc as shown in FIG. 1 and FIG. 2 by using the disposal apparatus as shown in FIG. 3.

Even after the reflective layer 1c and the protective layer 1d are peeled off from the optical disc 1, as shown in FIG. 8, the surface of the protective layer side of the optical disc 1 is cut at the aforesaid depth by the first bite 13 and, by virtue of which, the recording layer 1b remained at the substrate layer 1a side is removed by cutting from the substrate layer 1a and the removed recording layer 1b is discharged outside the disposal chamber 11 from the absorbing opening 11a as if drew into a flow of air formed inside the disposal chamber 11 similarly as described above and collected inside the predetermined container.

Figure 9:
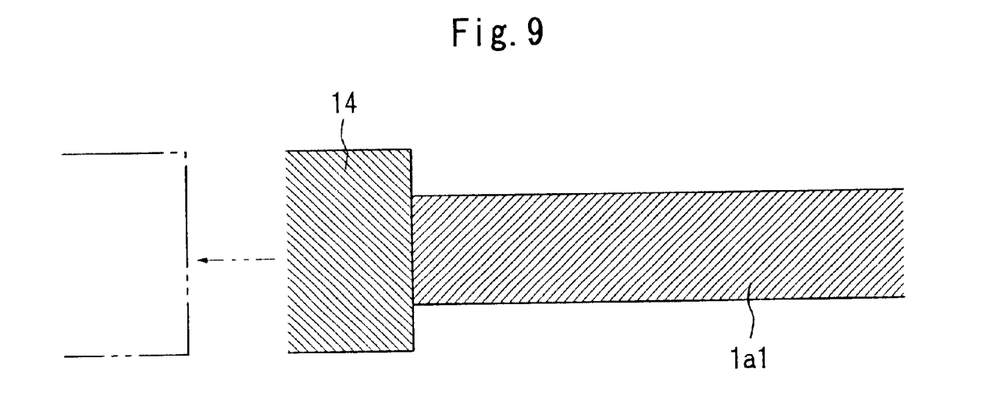
FIG. 9 is a diagram showing a procedure for executing waste disposal of the optical disc as shown in FIG. 1 and FIG. 2 by using the disposal apparatus as shown in FIG. 3.

Also, as shown in FIG. 9, the outer peripheral surface of the substrate layer 1a is cut at the aforesaid cutting depth by the second bite 14 and, by virtue of which, a part of the protective layer 1d1 remained at the outer peripheral surface of the substrate layer 1a is removed by cutting from the substrate layer 1a and the removed protective layer 1d1 is discharged outside the disposal chamber 11 from the absorbing opening 11a as if drew into a flow of air formed inside the disposal chamber 11 similarly as described above and collected inside the predetermined container.

When the cutting of the surface of the protective layer of the optical disc 1 is over, the first bite 13 returns to the waiting position and leaves the substrate layer 1a1 subsequent to the disposal. Also, when the cutting of the outer peripheral surface of the optical disc 1 is over, the second bite 14 returns to the waiting position and leaves the substrate layer 1a1 subsequent to the disposal (refer to phantom lines of FIG. 8 and FIG. 9).

After this, the substrate layer 1a1 subsequent to the disposal is released from absorption hold and taken out from the turn-table 12 and another optical disc 1 is placed on the top of the turn-table 12, thereby continuing to execute the disposal as similarly described above. Placing the optical disc 1 on the top of the turn-table 12 and taking out the substrate layer 1a1 subsequent to the disposal can be executed optionally by a well-known manipulator which makes pick and place possible.

According to the aforesaid disposal apparatus, by a simple disposal method, the substrate material from the waste optical disc can be collected without any material change and, furthermore, the substrate material of high purity can be collected and recycled in a wide range of applications. Also, since the operation for collecting the substrate material from the waste optical disc by removing unwanted layers can be implemented at high efficiency, there is an advantage that a running cost required for each disc can be greatly reduced.

Note that, in the embodiment as shown in FIG. 1 to FIG. 9, the optical disc 1 having the recording layer 1b, the reflective layer 1c and the protective layer 1d on the substrate layer 1a is treated as the disposal object. However, discs damaged in the middle of a production, discs treated as defective at a final inspection process after the production, discs treated as surplus stock after labels being attached or the like, that is, any of the optical discs in which whatever layer is formed on the substrate layer 1a, collection of the substrate material can be precisely executed by the same disposal method as described above.

Also, in the embodiment as shown in FIG. 1 to FIG. 9, an example was shown wherein blow-out nozzle 15 moves in parallel with the first bite 13. However, if the blow-out nozzle orifice 15a is formed in shape capable of blowing air along the cutting line of the first bite 13, the same operation efficiency as described above can be obtained even when the blow-out nozzle 15 is fixedly arranged.

Further, in the embodiment as shown in FIG. 1 to FIG. 9, while in the process wherein the first bite 13 is moved toward the inside from the outside of the optical disc 1, an example was shown wherein the surface of the protective layer of the optical disc 1 is cut. However, in the process wherein the first bite 13 is moved toward the outside from the inside of the optical disc 1, the surface of the protective layer side of the optical disc 1 may be cut. In this case, an operation is required wherein the first bite 13 is withdrawn from the optical disc 1 after cutting and returned to the inside position of the optical disc 1, but no particular trouble arises even when the surface of the protective layer of the optical disc 1 is cut.

Furthermore, in the embodiment as shown in FIG. 1 to FIG. 9, an example was shown wherein a CD-R known as one of write-once discs is used. However, write-once discs other than the CD-R, read-only discs such as a CD or the like and rewritable discs such as a CD-RW or the like can be made a disposal object and the same operation efficiency as described above can be obtained even by just properly controlling a cutting depth for the surface of the protective layer of the optical disc.

Other than these discs, the read-only discs such as a DVD or the like, the write-once discs such as a DVD-R or the like and the rewritable discs such as a DVD-RW or the like can be also made the disposal object. Citing the DVD-R known as one of the write-once discs as an example, the disposal method thereof will be described below with reference to FIG. 10 to FIG. 12.

Figure 10:
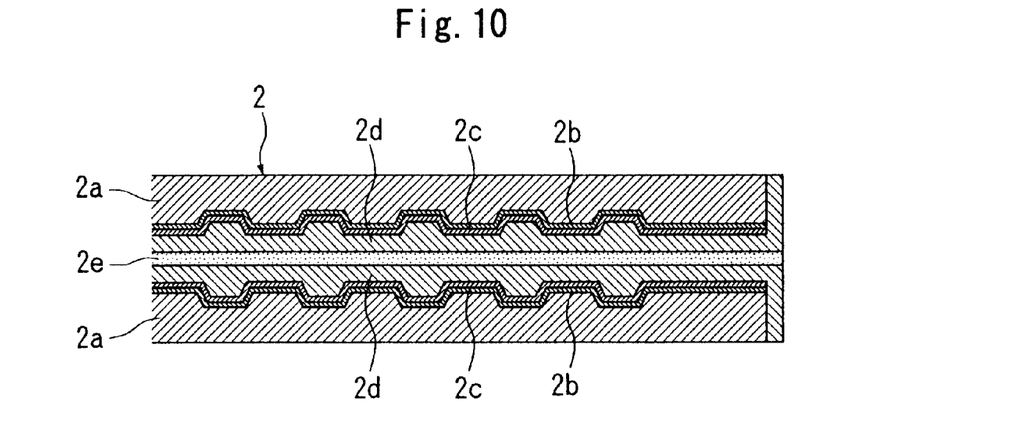
FIG. 10 is a diagram for describing a method adapted in a case where a substrate material is collected from an other optical disc.

As shown in FIG. 10, this optical disc 2 is configured by laminating two laminating layers through an adhesive layer 2e comprising an adhesive such as epoxy resin or the like, wherein a recording layer 2b, a reflective layer 2c and a protective layer 2d are laminated in order on a substrate layer 2a in such a manner that each substrate layer 2a looks toward the outside. The formation material of the substrate 2a, the recording layer 2b, the reflective layer 2c and the protective layer 2d is the same as that of the optical disc 1 as shown in FIG. 1 and FIG. 2.

Figure 11:
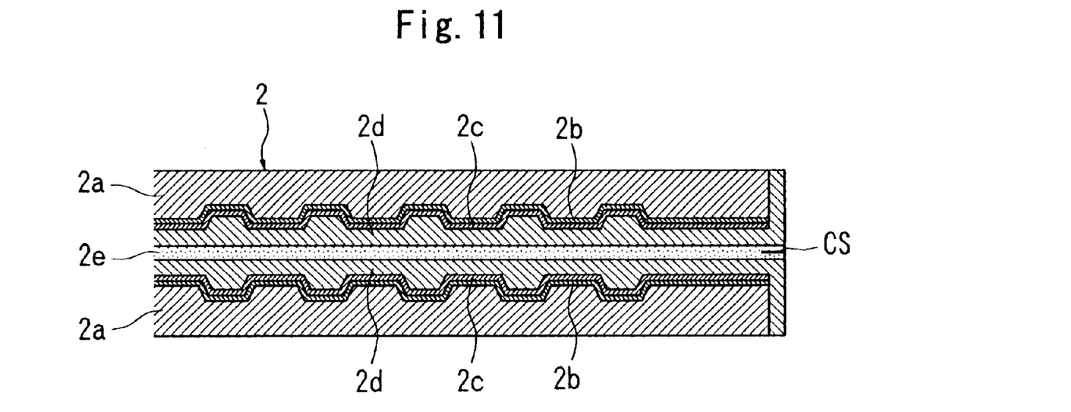
FIG. 11 is a diagram for describing a method adapted in the case where the substrate material is collected from an other optical disc.
Figure 12:
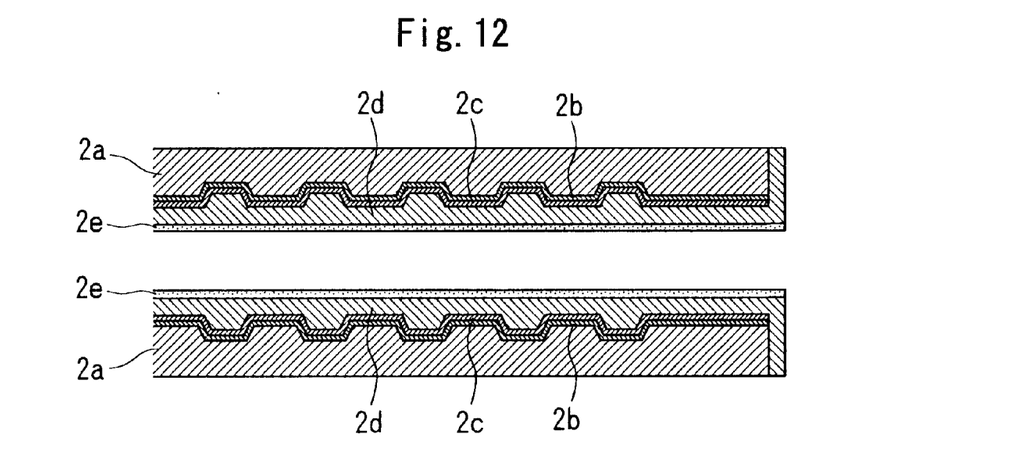
FIG. 12 is a diagram for describing a method adapted in the case wherein the substrate material is collected from an other optical disc.

At the time of the disposal, as shown in FIG. 11, a notch CS is put into a location corresponding to the adhesive layer 2e at an outer periphery of the optical disc 2 by using an appropriate tool and, as shown in FIG. 12, the optical disc 2 is split in two portions with the adhesive layer 2e as a boundary by gradually enlarging the notch CS by using the same tool as described above or a tool for split-up.

After this, similar to the disposal method as described by using FIG. 4 to FIG. 9, each split disc is placed on the top of the turn-table 12 so as to look upward and the reflective layer 2c, the protective layer 2d and the adhesive layer 2e are peeled off and removed from the split disc. The recording layer 2b and the remained protective layer of the outer peripheral surface of the substrate can be removed by cutting.

FIG. 13 to FIG. 16 show another embodiment of the present invention, and the optical disc 1 as shown in the drawings is the same as shown in FIG. 1 and FIG. 2.

Figure 13:
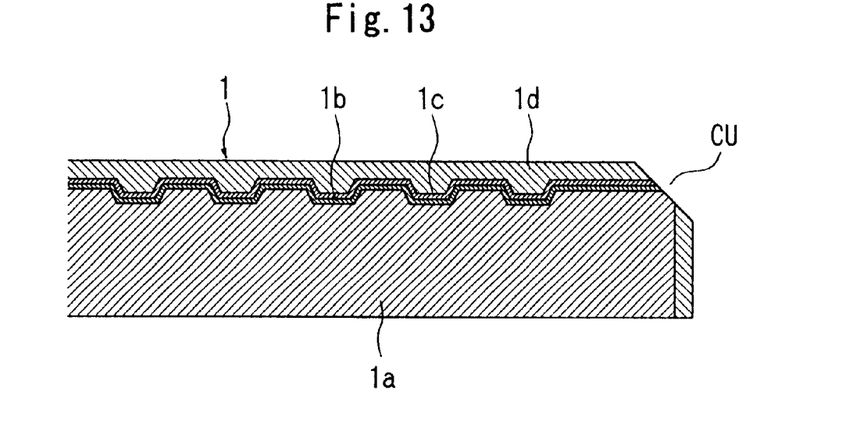
FIG. 13 is a diagram for showing a procedure for executing waste disposal of an optical disc according to another embodiment of the present invention.

At the time of the disposal, as shown in FIG. 13, on the outer peripheral edge of the protective layer side of the optical disc 1, a notch CU having a depth slightly larger than the sum Db (refer to FIG. 6) of the depth measurements of the protective layer 1d, the reflective layer 1c and the recording layer 1b is formed. This notch CU can be simply formed by a known technique such as a cutting and a grinding. The notch CU may be formed at a part of the outer peripheral edge or it may be a slit of narrow width.

Figure 14:
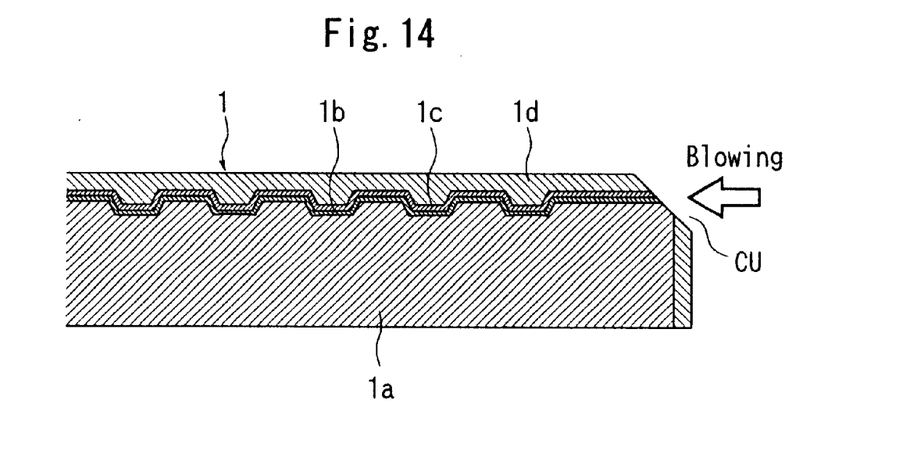
FIG. 14 is a diagram for showing a procedure for executing waste disposal of the optical disc according to another embodiment of the present invention.
Figure 15:
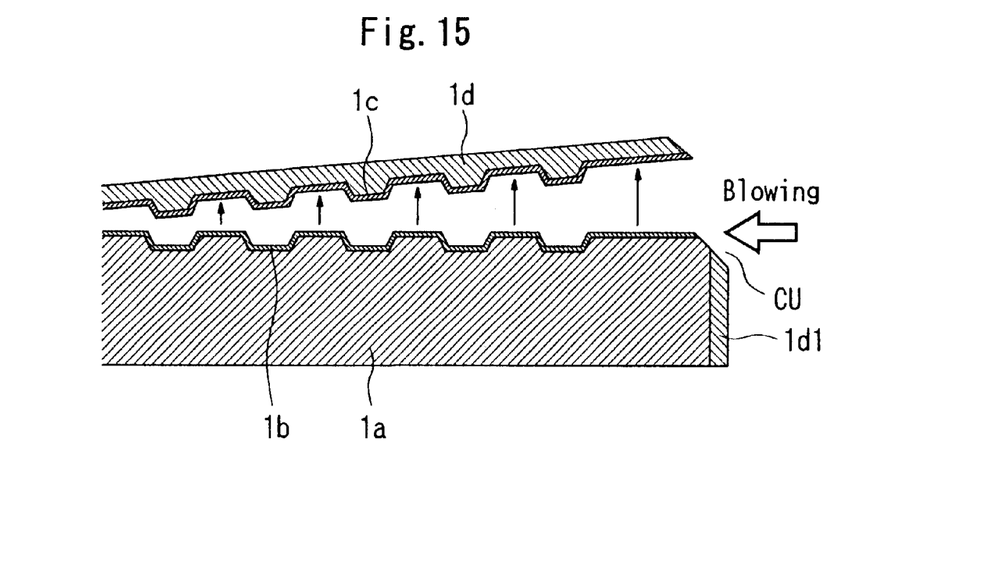
FIG. 15 is a diagram for showing a procedure for executing waste disposal of the optical disc according to another embodiment of the present invention.

And, as shown in FIG. 14, air is blown toward the notch CU (refer to an arrow of blowing in the drawing). By the external force given by the formation of the aforesaid notch CU, the space is partially created in a location adjacent to the notch of the boundary of the recording layer 1b and the reflective layer 1c between both of which there exists the smallest mutual adhesion, and as a result, as shown in FIG. 15, air blowing toward the notch CU invades from this space to the boundary of the recording layer 1b and the reflective layer 1c, thereby commencing to peel off the reflective layer 1c and the protective layer 1d from the optical disc 1c. If an air pressure is set high, even by this air blowing, the reflective layer 1c and the protective layer 1d can be peeled off. However, by using the disposal chamber 11 such as shown in FIG. 3, the peeling off of the reflective layer 1c and the protective layer 1d can be executed effectively.

Even if the reflective layer 1c and the protective layer 1d are peeled off from the optical disc 1, the recording layer 1b remains on the substrate layer side 1a and a part of the protective layer 1d1 remains on the outer peripheral surface of the substrate layer 1a. Therefore, the remained recording layer 1b is cut and removed by the first bite 13 such as shown in FIG. 3 and the remained protective layer 1d1 is cut and removed by the second bite 14 such as shown in FIG. 3.

In case of forming the notch CU in the optical disc 1, though manpower will increase larger than it is necessary for the embodiment as shown in FIG. 1 to FIG. 9, if a notch forming process is implemented in a different place in advance, unwanted layers can be removed by using the apparatus as shown in FIG. 3 and a collecting operation of the substrate material can be executed effectively.

Figure 16:
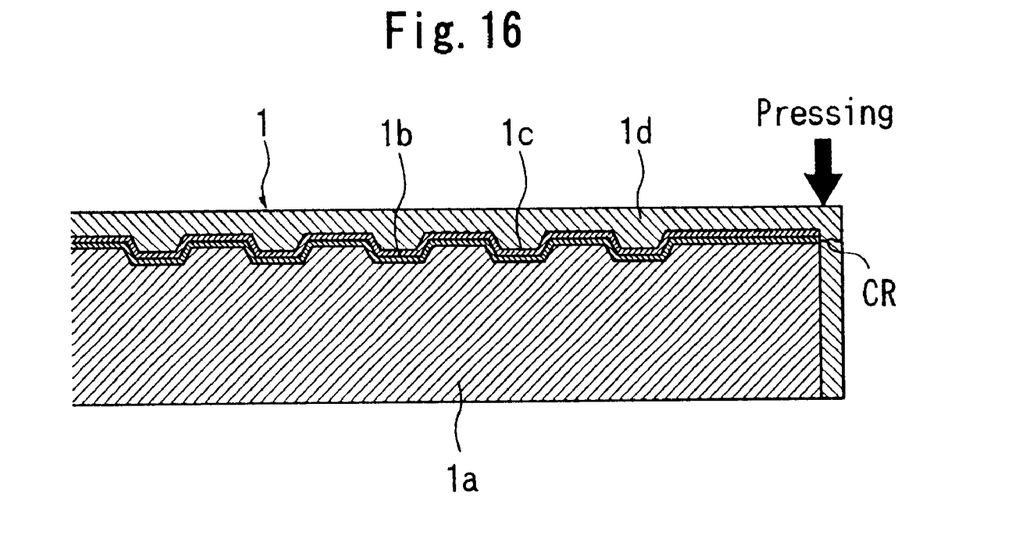
FIG. 16 is a diagram for showing a procedure for executing waste disposal of an optical disc according to still another embodiment of the present invention.

Note that, in the embodiment as shown in FIG. 13 to FIG. 15, by giving the external force accompanied with the formation of the notch CU, the space is created in a location adjacent to the notch of the boundary of the recording layer 1b and the reflective layer 1c between both of which there exists the smallest mutual adhesion. However, as shown in FIG. 16, by partially applying a pressure (refer to an arrow of pressing in the drawing) on the surface of the protective layer side of the optical disc 1, the space can be also created between the layers with the smallest mutual adhesion by giving the external force accompanied with a pressure applied. The pressure at this time is several times larger than the pressure given when a user handles the optical disc 1 within a normal range of use, for example, from several $kg/cm^2$ to more than several tens of $kg/cm^2$. Also, no particular restriction is imposed on the tool required for giving the pressure. Although it does not matter if the substrate layer 1a or other layers are injured by the pressure given, it is necessary that a crack CR reaching a functional layer is created by the pressure given or that a damaged place reaching the functional layer is partially formed.

Figure 17:
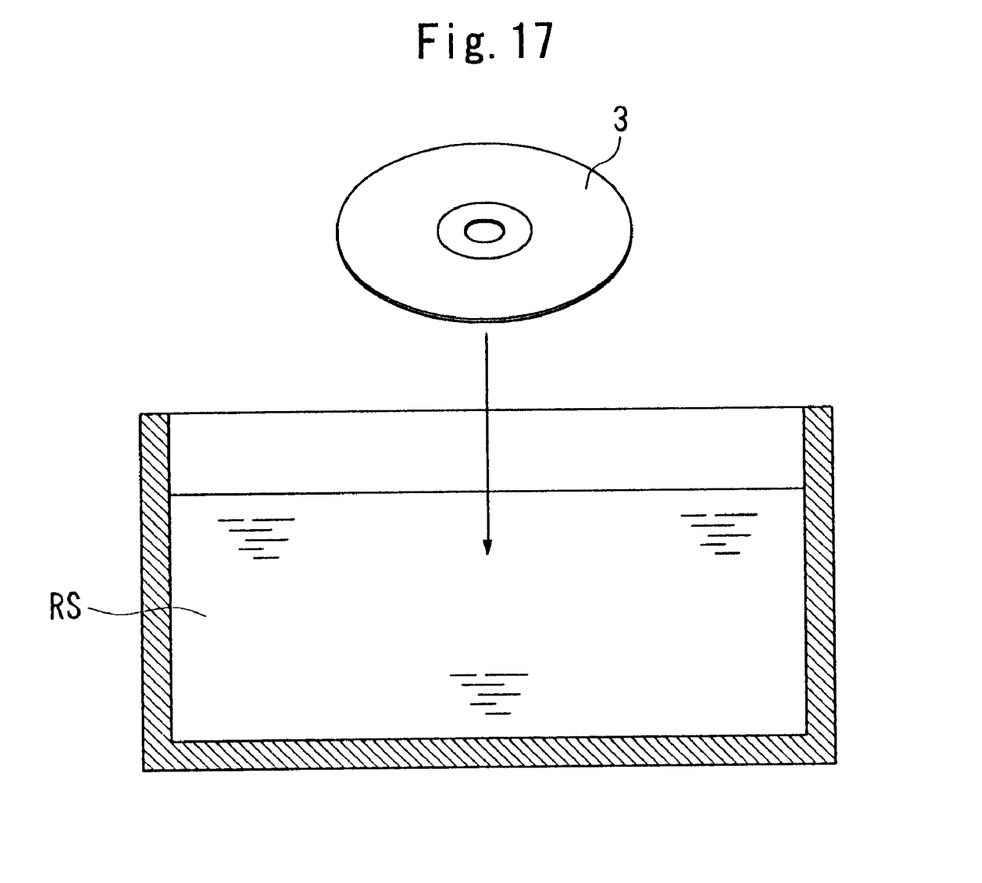
FIG. 17 is a diagram showing a method for removing layers remained on a substrate layer by a method other than cutting.

In the aforesaid embodiments, it was shown that the recording layer remained on the substrate layer side was removed by cutting, while in case of the CD-R or the DVD-R, this recording layer can be simply removed by an alcohol system solvent causing no material change to the substrate layer. Hence, as shown in FIG. 17, a removal of the remained recording layer may be executed by soaking in the solvent RS an optical disc 3 for a predetermined time after the reflective layer and the protective layer thereof are removed.

Even in case of the optical disc other than the CD-R or the DVD-R, if the layer remained in the substrate layer side can be removed by the solvent capable of causing no material change to the substrate layer, the aforesaid method can be adequately applied. For example, in case of a CD known as one of read-only discs, since the mutual adhesion between the substrate layer and the reflective layer comprising aluminum is large, the reflective layer can not be peeled off with the protecting layer by the aforesaid method. However, the reflective layer remained on the substrate layer side can be simply removed by the solvent causing no material change to the substrate layer.

Of course, in the case wherein unwanted layers can be peeled off all together from the optical disc, a disposal for removing the layer remained in the substrate layer by cutting or a disposal for removing the layer remained in the substrate layer by the solvent is not necessary.

INDUSTRIAL APPLICABILITY OF THE INVENTION

The method of disposing of waste optical discs according to the present invention is suitable for collecting and recycling the substrate material from the optical discs damaged in the middle of the production, discs treated as defective at a final inspection process after the production, and discs treated as surplus stock or the like. Since a substrate material of high purity can be collected, the collected substrate material can be used in a wide range of applications such as the substrate of the optical disc but also as a case of the optical disc, a body of personal computer or the like. The optical disc according to the present invention is suitable for executing the collecting disposal of the substrate material through this disposal method, and it is highly value-added as the optical disc is easy to recycle.

What is claimed is:

1. A disposal method of a waste optical disk having at least two layers on a substrate layer, the method comprising:

rotating the waste optical disk on a turn-table disposed within a disposal chamber;

moving a first bite cutting tool inwardly from a position external to the waste optical disk toward a center of the waste optical disk, a cutting depth of the first bite cutting tool being greater than a sum of thicknesses of said at least two layers;

blowing air towards an interface between the first bite cutting tool and the waste optical disk from a blowout nozzle; and absorbing outside air from inside of the disposal chamber through an absorbing opening from an intake vent;

wherein, upon the first bite cutting tool reaching the at least two layers, a space is created between said at least two layers and wherein said air blown from the blowout nozzle invades said space between said at least two layers, thereby causing at least the outermost of said at least two layers to be peeled off from the waste optical disk; and wherein the first bite cutting tool then removes any remaining layers of said at least two layers from the waste optical disk.

2. The method of claim 1, wherein said at least two layers comprises first, second, and third layers.

3. The method of claim 2, wherein said first, second, and third layers respectively comprise a protective layer, a reflective layer, and a recording layer.

4. The method of claim 3, further comprising moving the blowout nozzle in parallel with the first bite cutting tool.

5. The method of claim 4, further comprising cutting an outer peripheral surface of the waste optical disk with a second bite cutting tool.

6. The method of claim 3, further comprising cutting an outer peripheral surface of the waste optical disk with a second bite cutting tool.

7. The method of claim 2, further comprising moving the blowout nozzle in parallel with the first bite cutting tool.

8. The method of claim 7, further comprising cutting an outer peripheral surface of the waste optical disk with a second bite cutting tool.

9. The method of claim 2, further comprising cutting an outer peripheral surface of the waste optical disk with a second bite cutting tool.

10. The method of claim 1, further comprising moving the blowout nozzle in parallel with the first bite cutting tool.

11. The method of claim 10, further comprising cutting an outer peripheral surface of the waste optical disk with a second bite cutting tool.

12. The method of claim 1, further comprising cutting an outer peripheral surface of the waste optical disk with a second bite cutting tool.

13. The method of claim 1, further comprising locating a cemented carbide tip on a cutting end of the first bite cutting tool.

14. The method of claim 13, further comprising rotating the waste optical disk in a range of from 2000 to 6000 RPM (Revolutions Per Minute).

15. The method of claim 13, further comprising moving the first bite cutting tool at a feeding speed in a range of from 10 to 30 mm/second.

16. The method of claim 14, further comprising moving the first bite cutting tool at a feeding speed in a range of from 10 to 30 mm/second.

17. The method of claim 1, further comprising locating a diamond tip on a cutting end of the first bite cutting tool.

18. The method of claim 17, further comprising rotating the waste optical disk in a ranger of from 2000 to 5000 RPM (Revolutions Per Minute).

19. The method of claim 17, further comprising moving the first bite cutting tool at a feeding speed in a range of from 20 to 30 mm/second.

20. The method of claim 18, further comprising moving the first bite cutting tool at a feeding speed in a range of from 20 to 30 mm/second.

* * * * *